United States Patent Office 2,721,542
Patented Oct. 25, 1955

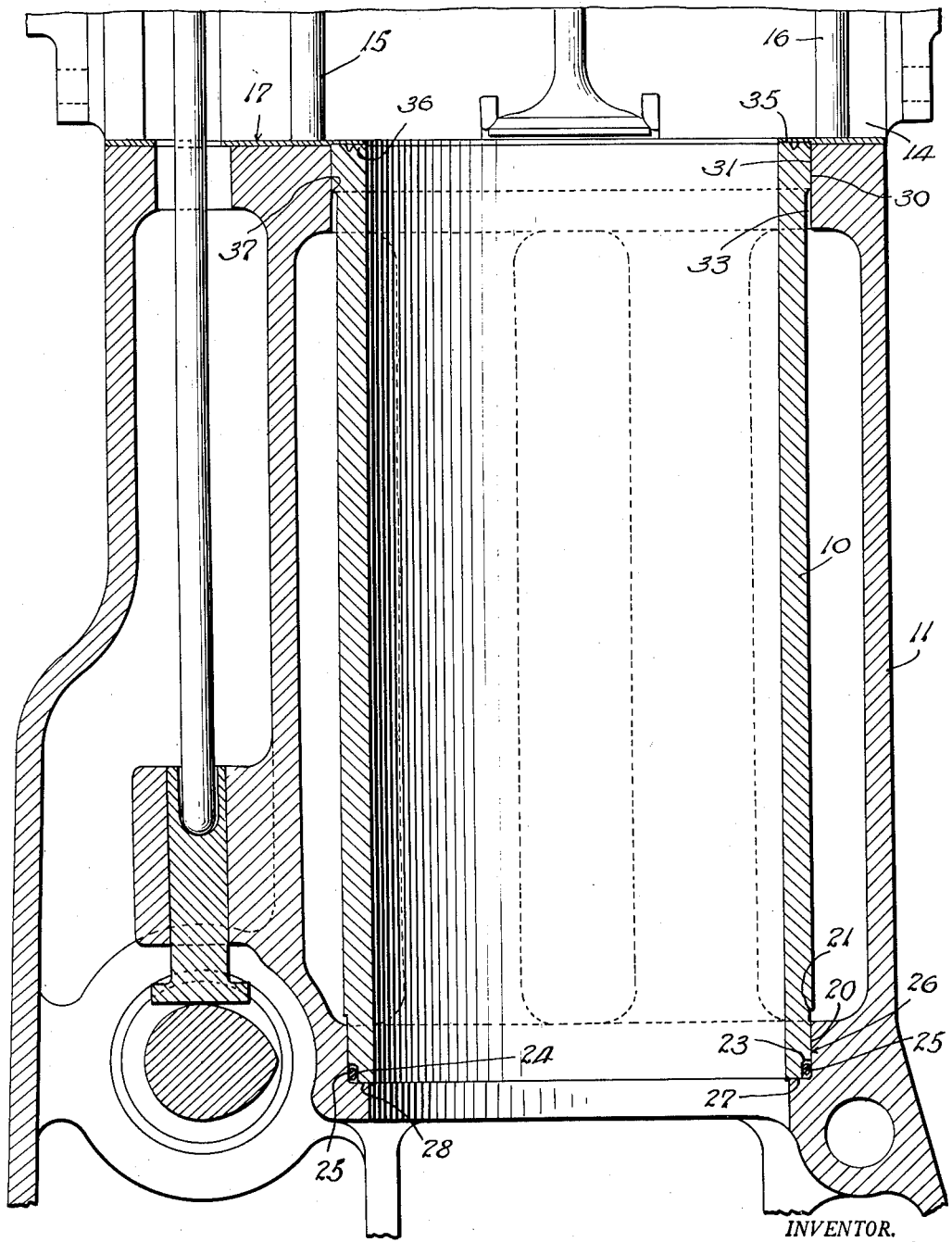

2,721,542

CYLINDER LINERS

Richard H. Sheppard, Hanover, Pa.

Application February 19, 1953, Serial No. 337,785

7 Claims. (Cl. 123—41.84)

This invention relates to cylinder liners of the type used in high pressure diesel engines where the pre-ignition pressures run up to 2000 pounds, and has for its principal object the provision of a liner free to move axially at its upper end whereby distortion is most materially reduced, being kept well within the two or three thousandths of an inch on a side usually considered the maximum permissible without serious trouble as regards the seating of the piston rings. In previous forms the liner has a top flange fitting in an annular recess at the top face of the block, whereby it is anchored so that the axial movement due to expansion is taken care of by the lower end of the liner floating freely in a bore proximate the bottom of the liner. While such anchoring does limit axial movement at the flanged end, the heavy clamping effect exerted by the compressible gasket plus the sideward pressure of the gases above the piston causes the liner to barrel out as much as eight or ten thousandths of an inch on a side in extreme cases, varying with all radial locations depending upon how near such locations are to the nearest cylinder head bolt. By anchoring the liner at the bottom and having the upper end slidable in the block the distortion is reduced to an amount from five ten-thousandths of an inch to zero but this would lead to loss of pressure at the gasket if the liner top were flush with the top of the block. This in turn is eliminated by making the liner long enough to project a few thousandths of an inch above the top face of the engine block when not under load. This pre-loads the liner and places the block in tension thus avoiding or minimizing the tendency of the cylindrical opening in the top of the block to bow in or become conical as was common where the flanged end of the liner was anchored at this point.

The figure is a vertical section.

The liner 10 is held in the engine block 11 to which is secured the head 14 by means of the usual bolts 15 and 16 carrying a pressure of about 15,000 pounds and confining a compressible gasket 17 which is preferably of a non-metal type, for example an asbestos-synthetic rubber sheet which will only yield about .01" in the sixteenth-inch size.

The liner 10 at its lower end is reduced in diameter as at 20, the shoulder at 21 having a radius of at least .015" while the radius at 23 is two to four times that large providing a smooth groove 24 to confine a ring seal 25. The surface 20 is polished altho the clearance between it and the polished bore 26 in the block is quite appreciable, from one to three thousandths so the liner may be dropped into place with the bottom surface 27 resting upon the shoulder or base 28 of the recess in the block. This anchors the liner at its bottom to the block so the axial expansion of the liner is above this point.

At the top of the liner 10 is the polished surface 30 which clears the polished surface 31 in the block by .001" to .003" when cold. To provide space for water to reduce the heat above it is a space 33 reducing the axial length of the surface 30 to about half that of the surface 31. The upper face 35 which engages the gasket 17 has a gasket groove 36 about .015" deep and twice that wide. The radius at 37 is about 1/16" and the greatest thickness of the liner for a 4½" diameter is about a third of an inch.

By virtue of the configuration illustrated the liner seats perfectly at its bottom and the top of the pre-stressed liner may expand when heated and still further compress the rather firm gasket which about reaches its point of maximum compressibility at the highest temperature which may be expected in the cylinder, that is, when the liner has elongated axially to the full extent contemplated. Under normal operating conditions the outside surface of the liner in contact with the water space 40 is at the same temperature as is the inside surface of the engine block 11 but there is a greater axial expansion of the liner, by several thousandths of an inch, than of the jacket, but no serious results have been found with an extension of the liner over the jacket of as much as a sixtieth of an inch. This liner eliminates most of the distortion experienced with liners anchored at the top, this usually resulting in a constriction of the diameter of the liner near the middle, two barrel shaped bulges, one above and one below the restriction, and a constriction at the anchored top. The surface 35 which is presented to the gasket 17 is completely backed up and there is no overhang.

The engine block will be distorted a bit at the top flange which takes the studs but this presents no difficulty for the pressure of the water is only 5 or 6 pounds as against a pressure within the cylinder of as high as 2,000 pounds at pre-ignition. Since the radial distortion is held so small, and sometimes entirely eliminated, the slight distortion of the block is of little relative consequence.

What I claim is:

1. In an internal combustion engine of the type in which cylinder liners are mounted in the engine block, a liner unyieldingly anchored to the block at its bottom with its top pre-stressed by extending above the upper surface of the block.

2. A diesel engine for high pressure operation of the type in which an engine block having openings therein is secured to an engine head by a plurality of tension members with a gasket between the head and the block and cylinder liners are fitted in the openings; characterized by the liners being anchored to the block at their lower ends, being of such length as to project above the level of the gasket engaging face of the block and therefore make an annular indentation in the face of the gasket under preload conditions, the upper end of the liner being free to slide axially in the block as the liner elongates when heated and thus to compress the gasket farther, thereby preventing passage of compressed gases from the cylinder radially of the liner at the junction of the gasket and liner, and minimizing distortion of the liner.

3. The engine of claim 2 in which the gasket is of a material that will compress not more than one-fourth its thickness.

4. The combination with a water-jacketed engine block having a circular opening in its top face and a coaxial shouldered recess to receive the bottom of a liner, of a cylinder liner slidingly fitting the opening at its upper end and fitting at its lower end in said recess to rest against the shoulder as a stop, a gasket with its lower face in engagement with the top face of the block and the upper end of the liner, a head engaging the upper face of the gasket, and cylinder head bolts for securing the head to the block and compressing the gasket, said liner projecting above the top face of the block when cold and projecting between .005" and .015" when under load, thereby forming an annular depression in the gasket to preload the liner and place the jacket under tension.

5. The combination of claim 4 in which the gasket comprises a synthetic rubber and is compressible to materially less than half its thickness, and the liner projects roughly .007" beyond the face of the block when under normal load conditions and projects at least .001" when cold.

6. The combination with an engine block having two spaced coaxial liner receiving openings, one of which has a shoulder to form a positive stop for the liner of a head, a gasket between the head and the block a liner fitting the two openings with a clearance of at least .001", resting on the stop, and projecting beyond the face of the block distant from the stop to engage the gasket, the resistance to compression of the gasket being sufficient to preload the liner when the head is secured to the block.

7. In combination, an engine block having a cooling chamber therein, a liner fitting the block at top and bottom and forming a cylinder, means for anchoring the bottom of the liner to the block, and means for limiting axial expansion of the upper end of the liner under load conditions to about .007" above the face of the block distant from the anchored end of the liner, the liner projecting beyond said face at least .001" when cold and is prestressed.

References Cited in the file of this patent

UNITED STATES PATENTS

| | | |
|---|---|---|
| 1,410,752 | Hart | Mar. 28, 1922 |
| 1,782,317 | Royce et al. | Nov. 18, 1930 |
| 1,816,819 | Austin | Aug. 4, 1931 |
| 2,127,825 | Mader | Aug. 23, 1938 |
| 2,146,368 | Dake | Feb. 7, 1939 |
| 2,168,131 | Mader | Aug. 1, 1939 |
| 2,170,015 | Ford | Aug. 22, 1939 |

FOREIGN PATENTS

| | | |
|---|---|---|
| 839,316 | France | Mar. 31, 1939 |
| 237,254 | Switzerland | Aug. 1, 1945 |